United States Patent [19]

de Vulpillieres

[11] 4,140,088
[45] Feb. 20, 1979

[54] PRECISION FUEL INJECTION APPARATUS

[75] Inventor: Didier J. de Vulpillieres, Southfield, Mich.

[73] Assignee: The Bendix Corporation, Southfield, Mich.

[21] Appl. No.: 824,884

[22] Filed: Aug. 15, 1977

[51] Int. Cl.² .............................................. F02B 3/00
[52] U.S. Cl. .............................................. 123/32 EA
[58] Field of Search ...... 123/32 EA, 32 EF, 119 EC, 123/139 AP, 139 E, 179 L, 32 EG, 32 G, 8.09, 8.11; 417/426–429

[56] References Cited

U.S. PATENT DOCUMENTS

| | | | |
|---|---|---|---|
| 2,190,348 | 2/1940 | Bach | 123/182 |
| 2,463,418 | 3/1949 | Pescara | 123/32 |
| 2,640,422 | 6/1953 | Malin | 417/428 |
| 2,803,230 | 8/1957 | Bensinger | 123/32 |
| 2,840,059 | 6/1958 | Buchi | 123/32 |
| 3,039,446 | 6/1962 | Vincent et al. | 123/32 |
| 3,533,381 | 10/1970 | Schmid et al. | 123/179 |
| 3,614,945 | 10/1971 | Schlagmuller et al. | 123/179 |
| 3,682,146 | 8/1972 | Mozokhin et al. | 123/119 |
| 3,884,195 | 5/1975 | Murtin et al. | 123/32 EA |
| 3,890,946 | 6/1975 | Wahl | 123/119 |
| 3,945,350 | 3/1976 | Ford | 123/32 EC |
| 3,949,551 | 4/1976 | Eichler et al. | 123/119 |
| 4,002,152 | 1/1977 | Hoshi | 123/32 EA |

Primary Examiner—Kathleen H. Claffy
Assistant Examiner—Gerald L. Brigance
Attorney, Agent, or Firm—William A. Marvin; Gaylord P. Haas, Jr.; Russel C. Wells

[57] ABSTRACT

A fuel injection control system and technique for an internal combustion engine is disclosed having at least one controlled offset fuel injector valve and only one controlled trim injector valve. The offset injector valves produce a constant quantity of fuel by being energized for a fixed pulse duration each injection cycle while the difference between that constant quantity and a desired fuel injection quantity calculated from a fuel schedule is supplied by the variable trim injector. The fuel supply schedule is determined by the engine variables of the operating system by an electronic fuel scheduler circuit which further supplies fuel injection timing pulses for triggering the beginning of the injection cycle. An alternate embodiment discloses using an electromechanical distributer to select which of the offset fuel injectors are energized during an injection cycle and a third embodiment illustrates the use of the fixed pulse width associated with the offset injectors to enable the selection process of the electromechanical distributor.

18 Claims, 7 Drawing Figures

PRIOR ART FIGURE

PRECISION FUEL INJECTION APPARATUS

BACKGROUND OF THE INVENTION

1. Field of the Invention

The invention pertains generally to electronic fuel injection systems for internal combustion engines and is more particularly directed to a fuel schedule delivery system for multiple fuel injectors at a single injection point.

2. Description of the Prior Art

With the increasing need for more precise control of fuel mixtures to internal combustion engines, many in the art have turned to electronic fuel management systems for the answer. These electronic fuel management systems compute the basic fuel needs of the internal combustion engines and control the fuel delivery by opening and closing one or several solenoid operated fuel injectors. Generally, a computation is made of the desired amount of fuel and a variable length electrical pulse is supplied to the coil of the injector to open it for a duration equivalent to the quantity necessitated.

These electronic fuel management systems have been used successfully in single and multi-point type systems. In a multi-point system each cylinder or distribution point has a separate controllable injector which may be fired sequentially, simultaneously, or in a combination of modes with the other injectors, whereas in a single point system, a plurality of injectors is found at a single ingestion point, typically the throttle body or the intake manifold of the engine. However, multiple injectors for each ingestion point in multi-point systems are becoming more common because increased accuracy can be obtained with more than one injector per cylinder.

There have been some problems encountered with utilizing multiple injectors at a single point, in that to match the fuel schedule requirements of the engine and emission standards, several different size injectors have been used. Precision small injectors are necessitated in the so-called emissions operating range of engine conditions to provide the best accuracy of fuel delivery and larger injectors are used in the so-called power operating range of engine conditions where large fuel deliveries are required. Different injectors of different sizes are burdensome to match to the fuel schedule and switchover problems can create inaccuracies in the fuel delivery.

The multiple injectors are also difficult to control when the engine reaches the border conditions where the small injectors have to be shut off and the large injectors are turned on. When the engine operates approximately at the switching point, this condition may cause some instabilities in the system as it tries to switch back and forth or oscillate between the two sets of injectors. One such system that discloses the use of a hysteresis characteristic to overcome this boundary condition is a U.S. Pat. No. 4,002,152 issued to Hoshi, Jan. 11, 1977. However, by using this hysteresis condition, the system will not follow the fuel delivery schedule with a great amount of precision around the operating point, required to accurately control emissions.

Another factor to be considered is that in multiple injector single-point systems the fuel preparation changes abruptly as the cross-over is reached and therefore the spray patterns are not the same with the different sizes of injectors. This can cause considerable inaccuracy between the amount of fuel actually delivered and the fuel schedule amount determined by the feedback control system.

SUMMARY OF THE INVENTION

The invention provides an electronic fuel injection system which supplies a desired quantity of fuel to a single fuel ingestion point for a plurality of fuel injectors according to the equation:

$$Q_o = \sum_n^i Q_i(\text{offset}) + Q(\text{trim})$$

Where $Q_o$ is the total amount of fuel necessitated by a fuel schedule and computed from a number of engine variables, $Q_i(\text{offset})$ is a quantitative measure of the fuel supply from a plurality of offset injector means providing a constant fuel quantity each injection cycle from a fixed pulse length, and $Q(\text{trim})$ is a quantity of fuel supplied from an electronically controlled injector energized by a variable length pulse.

According to the technique, the offset injectors supply a constant quantity that is reproducible with a high degree of accuracy. The reproducibility is effected by having the offset injector not operate in the nonlinear ranges of the injector and by not operating over the wide ranges of pulse widths which have caused imprecision in the prior art. Each offset injector can be calibrated to inject its predetermined amount at a single point in the linear range where the operating characteristics of the injector are known. Even injectors with manufacturing tolerances which are less than acceptable in many systems will accurately reproduce the same fuel quantity if energized with a fixed pulse width. Thus, the need for multiple, expensive precision injectors in these systems and consequent matching problems are minimized. Therefore, only one variable injector or trim injector in combination with the offset injectors is needed to reproduce a fuel schedule.

Further, since each offset injector will always inject the same quantity of fuel, the spray pattern for each individual injector will be substantially the same. Such known spray patterns allow the offset injectors to be positioned at the ingestion point for the most advantageous response from the system.

According to a preferred embodiment of the invention, the multiple injectors are each electromagnetically operated solenoid valves where the offset injectors are operably energized by a fixed pulse width and the trim injector is operably energized by a variable pulse width. Offset selection means are provided to determine which of the offset injectors, if any, are to be energized during a specific engine cycle and to calculate the quantity of fuel injected therefrom. The offset selection means further provides a signal representative of the difference between the desired fuel quantity and the offset injection amount. This difference signal is transmitted to trim selector means which select the trim injector for energization and determine the duration of the variable length pulse needed for driving the trim injector.

A second embodiment includes an electromechanical distributor means operable to select the offset injectors energized during each injection cycle. The distributor means is controlled by a stair-step distributor select signal from the offset selection means which causes the distributor means to change position for each level change of the distributor select signal. A valve means gates a pressure wave of a fixed time duration to the inlet side of the distributor and the pressure wave is thereafter selectively switched to the selected offset injectors by the position changes of the distributor.

A third embodiment provides switching means for gating the distributor select signal to the distributor means during the time of the fixed pulse width for the offset injectors.

Therefore, it is an object of the invention to provide a more precise fuel control technique in a fuel management system.

It is a further object of the invention to provide a more precise fuel control system using at least one offset injector and a trim injector.

These and other embodiments, aspects, features and objects will be more fully understood from the following detailed description when taken in conjunction with the appended drawings wherein:

DETAILED DESCRIPTION OF THE PREFERRED EMBODIMENTS

Figure 1:
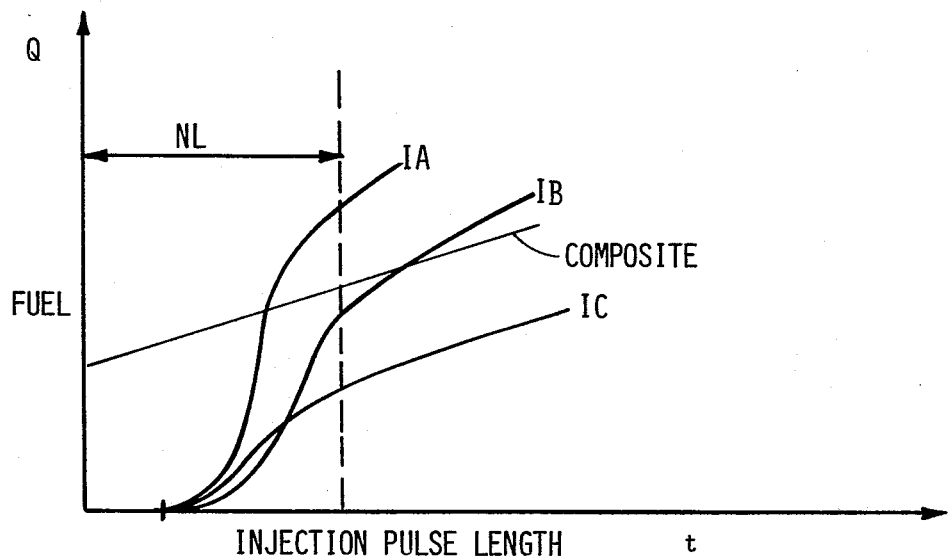
FIG. 1 is a graphical illustration of injected fuel quantity as a function of time and orifice opening for a plurality of injection valves.

With attention presently directed to the first figure, there are illustrated typical responses of electromagnetically operated solenoid fuel injectors. Each graph, IA, IB, IC, shows the amount of fuel injected as a function of injection pulse duration. As is evident, the longer an injection valve is held open, i.e., energized, the more fuel that will be injected. The differing slopes and, therefore, the differing fuel amounts injected for the three curves, are caused by changing the orifice size from injector to injector. A larger size of orifice, as in injector IA, will produce the most rapid change in fuel quantity per unit time (slope).

It is further seen, however, that the graphs are not completely linear functions and comprise a nonlinear portion NL and a linear portion L, for example, in injector IC. The nonlinear portion NL is caused by the injector inertia and other time delays inherent in operating mechanical or electromechanical devices. Reasonably priced injectors further have inaccurate flow rates for short pulse durations because of manufacturing tolerances, etc. Only with costly precision injectors, or costly electrical compensating techniques, will short pulse widths provide fairly controllable quantities.

It is also apparent that injectors of differing sizes have differing amounts of non-lineanty and even similarly sized injectors will differ in characteristic somewhat. Matching problems become prevalent when similar sized injectors are found with unlike characteristics. Thus, when multiple injectors of this type are provided at a single ingestion point and all are operated at variable pulse widths to provide a composite fuel schedule, many nonlinear injection operations may occur causing an imprecise fuel quantity detrimental to emissions or other controlled variables.

Referring now to the second illustrative figure, a more complex fuel schedule f is shown where fuel quantity $Q_o$ is a function of many engine variables. For example, a speed density relationship could be utilized where RPM and Manifold Absolute Pressure are the variables controlling the base fuel injection quantity.

Other corrective factors such as temperature, load, or operator induced transients can be utilized to form a complex function as illustrated in the drawing.

The invention reproduces this schedule with substantial precision by utilizing a plurality of offset fuel injectors each delivering a constant quantity of fuel during an injection cycle and a single trim injector that is operable to provide a variable quantity. To illustrate, $f(S_1)$ is a particular point A on fuel schedule f requiring a quantity $Q_1$. Likewise, $f(S_2)$, at point B, requires a quantity $Q_1 + Q_2$ and any arbitrary point $f(S_n)$, at point C, would require a quantity $Q_1 + Q_2 + \ldots Q_n$. If offset injectors 1, 2, 3, 4, 5 ... n are assigned to supply constant quantities $Q_1, Q_2, Q_3 \ldots Q_n$, then only one extra variable injector is needed to produce any arbitrary point on the fuel schedule. Of course, the variable, or as now defined, trim injector, must be able to deliver a quantity of fuel greater than the difference between any two offset points. Returning for an instant to the fuel schedule, values of f between zero and $S_1$ would be supplied by the trim injector. At $S_1$ and above, the first offset injector would be operable to supply $Q_1$.

Between $S_1$ and $S_2$ the first offset injector and the trim injector would be energized. At $S_2$ the second offset injector would become operable and the trim injector would provide variable quantities in the range from point B to point C. Therefore, it is seen that at each offset point a level shift will take place to produce a base for the trim injector which injects a variable quantity equal to the difference between the quantity desired and that base or offset level.

As described above, the preferred form of the offset injectors has all injectors providing substantially equivalent quantities of fuel where each successive offset level is the sum of all offset injector quantities to that point. As an alternative, the offset injectors can be provided as increasing larger injectors (orifice size) where each is actuated in sequence as the engine variables increase the fuel schedule. Still another alternative can be provided where, instead of orifice size, each fixed offset pulse width is different (longer) for successive level shifts thereby increasing fuel quantity delivered as the system steps from $S_1$ through $S_n$. Importantly, each offset injector should only be required to produce one reproducible quantity of fuel for any and all operations.

Figure 3:
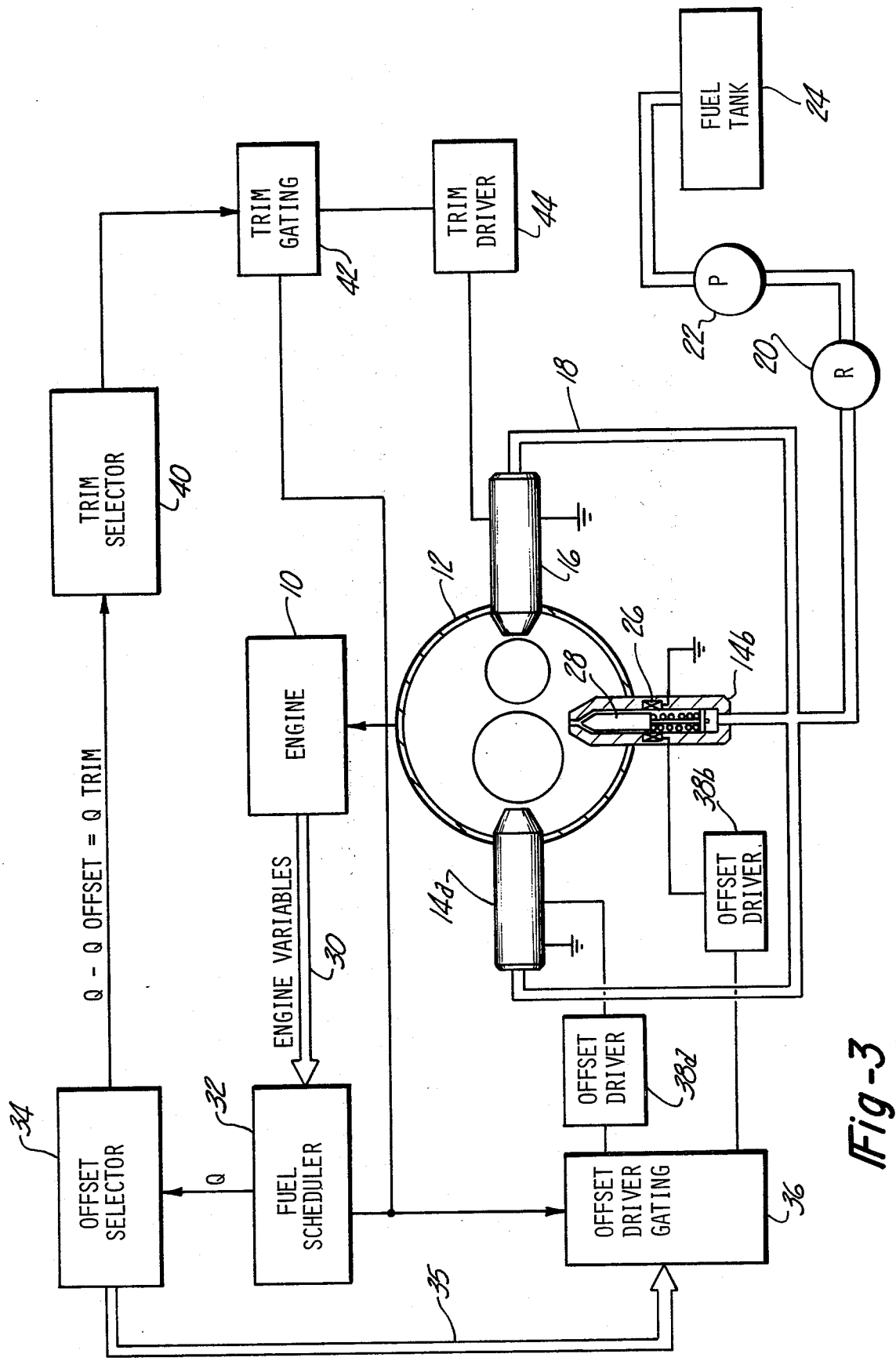
FIG. 3 is a schematic system diagram of a fuel management system constructed in accordance with the invention.

With reference now to FIG. 3, there is shown a fuel management system constructed in accordance with the invention. The system includes an internal combustion engine 10 having at least one ingestion point 12 where fuel and air are mixed to form a combustion charge for powering the engine. In the figure, the ingestion point 12 forms part of a throttle body throat connected to the intake manifold (not shown) of the engine 10 but could readily be as the intake valving to a single piston.

At the ingestion point 12 the air flowing into the engine is mixed with fuel from a plurality of injector valves 14a, 14b and 16 to form an air/fuel mixture which is burnable in the cylinders of the engine. These injector valves include offset injector valves 14a, 14b which provide a constant quantity of fuel for each injection cycle if energized, and a trim injector valve 16 which produces a variable quantity of fuel for all cycles. Each injector valve in the preferred embodiment is of the solenoid type having a pressurized line 18 forming a fuel supply under pressure to the inlet side of each injector. The pressure is maintained by a pressure regulator 20 which cooperates with a fuel pump 22 connected to a fuel reservoir 24 to supply fuel to the system.

Each injector illustrated, for example 14b, has a load coil 26 which when electrically energized will produce a movement of a fuel needle 28 to open the orifice of the valve and allow the pressurized fuel to spray into the ingestion point 12. The amount of fuel injected is directly proportional to the opening size of the injector valve and the amount of time that the valve remains open. By changing either the orifice size of the injector or the pulse width of the driving signal to the load coil 26, the amount of fuel that is injected may be substantially varied in accordance with the desired quantity.

For non precision injectors operated at variable pulse widths in their nonlinear regions, these quantities are not reliably reproducible. According to the invention, the offset injectors 14a, 14b will produce accurate quantities, reproducibly, when operated in a linear region of the injector with a fixed pulse width.

The fuel injection system further comprises a fuel scheduler 32 which receives information via a data bus 30 from the engine. These variables may include manifold absolute pressure MAP, the engine speed, load, temperatures or throttle position. The fuel scheduler 32 then takes these variables that are generally received by analog sensing of the operating parameters of the engine and applies them to a fuel schedule, possibly with closed loop adjustments, to determine the amount of fuel to be injected by the system. This quantity of fuel $Q_o$, which is a function of all the engine variables, is in the preferred form an analog voltage, but could easily be in digital form as a number. The fuel scheduler 32 further produces trigger pulses $T_i$ which are indicative of the beginning of the timing of the injection pulses. As known in the art, the trigger pulses $T_i$ are RPM dependent.

Thus, the fuel scheduler 32 will provide information relating to the amount of fuel needed and the time at which it should be injected. Fuel schedulers of this type are conventional and comprise various configurations. An advantageous example of a scheduler of this type is found in a U.S. Pat. No. 3,734,068 issued to J. N. Reddy and commonly assigned with the present disclosure. The disclosure of Reddy is expressly incorporated herein by reference.

The system receives the fuel quantity $Q_o$ from the fuel scheduler 32 and transmits a quantity signal to an offset selector circuit 34 which will determine which of the offset selectors will be used to form the fuel injection quantity for next engine injection cycle. The offset selector circuit 34 thus produces offset select signals via select lines 35 to offset driver gating 36. The offset select signals are gated through the offset driver gating 36 by the trigger pulses from the fuel scheduler 32 to drive individual offset drivers 38a, 38b which open the offset injector valves 14a, 14b respectively.

Another output of the offset selector circuitry 34 is the difference between the calculated amount of fuel that will be injected by the offset injectors Q(offset) and the desired quantity $Q_o$ which will now be defined as Q(trim). This amount, if it is positive, will energize a trim selector circuit 40 which produces as an output a select trim signal to the trim gating 42. As was the offset driver gating 36, the trim gating 42 is enabled by the trigger pulses ($T_i$) developed by the fuel scheduler 32 via conductor 33 to drive the trim driver circuit 44 which thus opens the trim fuel injector 16 by energizing trim driver line 45.

In operation the fuel scheduler determines the quantity $Q_o$ and offset selector circuit 34 selects a combination of offset injectors which will provide a level, Q(offset), which is less than the fuel quantity desired. When the trigger pulse from the scheduler circuitry 32 occurs the offset driver gating 36 will enable those offset injectors selected by a fixed pulse width to inject the fuel calculated by the selector circuit 34. Each offset injector or sum of the offset injectors will produce some set point on the fuel schedule curve. The difference between the amount needed by the ingestion point 12 and the amount provided by the offset injectors is input to the trim gating 42 where a variable width pulse will be generated proportionately to the trim signal. Concurrently with the offset driver gating 36, the trim gating 42 gates the variable pulse width when the trigger pulse occurs to the trim injector driver 44. This combination of using constant pulse width offset fuel injectors and a variable pulse width trim injector provides a facile method of precision fuel control.

Figure 4:
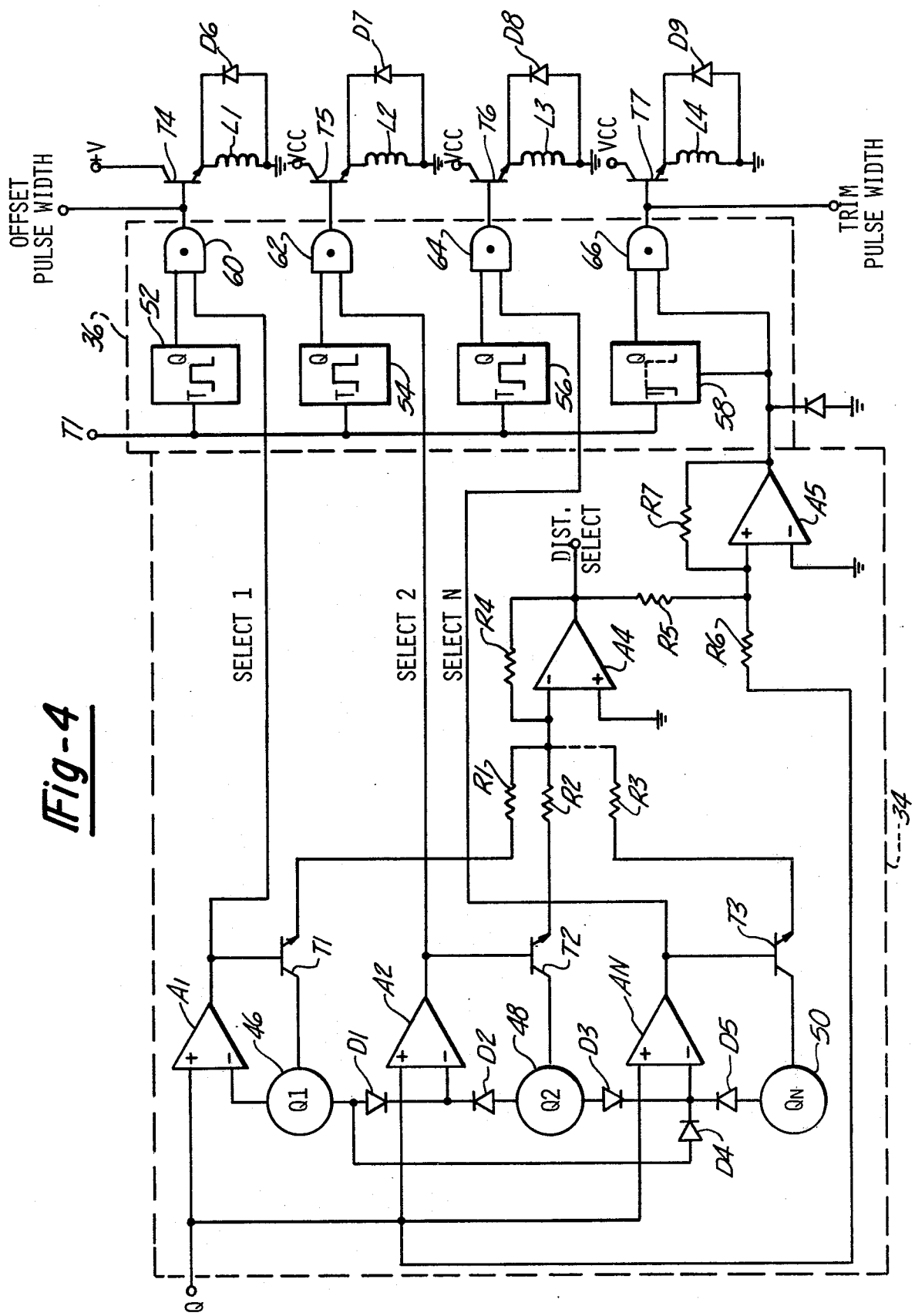
FIG. 4 is a detailed electrical schematic of circuitry illustrated in the system diagram of FIG. 3.
Figure 5A:
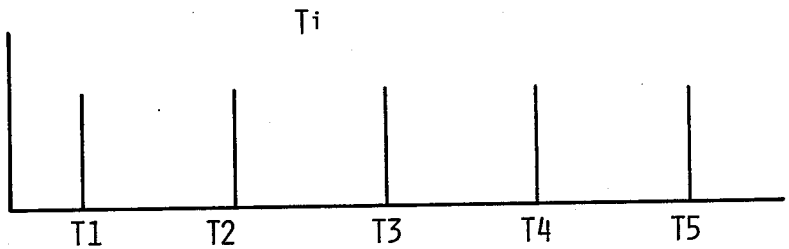
FIG. 5 (comprised of 5a–5e) is a system timing diagram of particular signals at various points in the circuitry illustrated in FIG. 4.
Figure 5B:
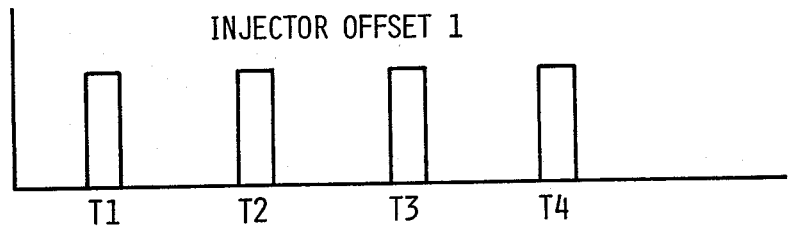
Figure 5C:
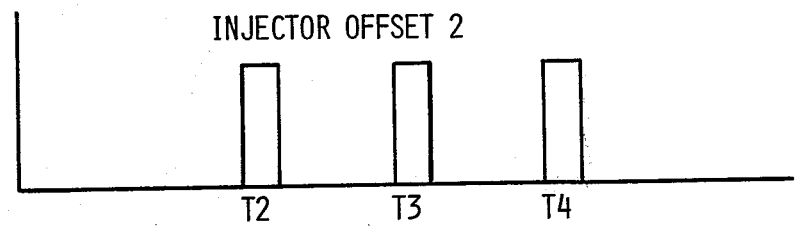
Figure 5D:
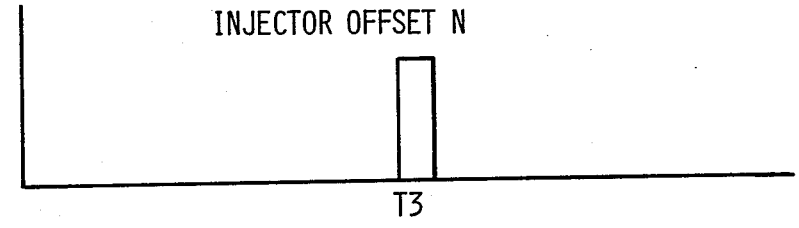
Figure 5E:
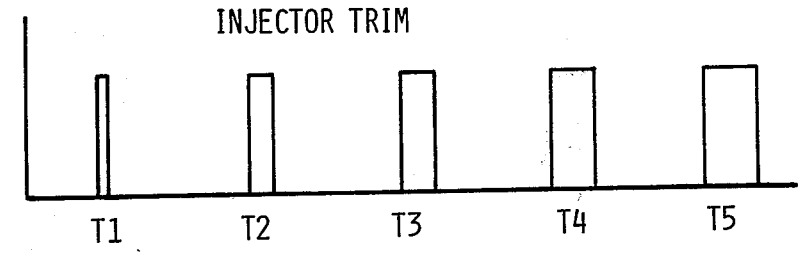

Turning now to FIG. 4, there is shown detailed circuitry comprising the offset selector circuit 34, the offset driver gating 36, the offset drivers 38a, 38b, the trim selector circuit 40, the trim gating circuit 42, and trim driver circuit 44. Offset selection circuitry 34 comprises a plurality of differential amplifiers A1, A2 ... $A_n$, all of which have their non-inverting input attached to an input data line 33. To the inverting input of the amplifier A1 is also connected an offset voltage 46 indicative of some fuel value $Q_1$. The output of the amplifier A1 forms a select offset injector one signal ($SEL_1$) on the line and further provides a triggering signal to the base of transistor T1. The offset voltage 46 is also connected to the collector of the transistor T1 and flows through T1 to the emitter when the $SEL_1$ signal is high. The offset voltage 46 further is summed at the inverting input of amplifier A2 with the offset voltage 48 representative of the fuel quantity $Q_2$ supplied by offset injector two (14b). Diodes D1 and D2 are poled to gate the offset voltages 46, 48 in the proper direction to the inverting input of the amplifier A2.

The output of the amplifier A2, the select offset injector 2 signal ($SEL_2$), is used to trigger the base of transistor T2 which transmits the offset voltage 48 from its connection at the collector of the transistor through T2. Offset voltages 46, 48 and 50 are further summed at the inverting input of amplifier $A_n$ through poling diodes D3, D4 and D5 which separate those referenced voltages. The offset voltage 50 which is representative of a fuel injection quantity of an arbitrary offset injector N is further connected to the collector of transistor T3 which is triggered by the select N signal ($SEL_N$) from the output of amplifier $A_n$. The SEL N signal turns the base of transistor $T_n$ on to transmit the offset voltage 50 therethrough.

The emitters of transistors T1, T2, and $T_n$ are connected to a summing junction which forms the negative or the inverting input to amplifier A4 through bias resistors R1, R2 and R3, respectively. The transmitted offset voltages 46, 48 and 50 are concurrently presented in analog form at the junction when their respective transistors are in their conductive states.

Amplifier A4, which has its non-inverting input grounded and a gain resistor R4 connected between its inverting input and its output, is a summing amplifier with a nominal gain of one which will perform an analog addition of the voltages presented over the resistors R1, R2 and R3. The output of the amplifier A4 is connected to the non-inverting input of amplifier A5 through bias resistor R5. The second input to the non-inverting junction of the amplifier A5 is the data line 33 which transmits the quantity desired signal through a bias resistor R6. Amplifier A5, having resistor R7 connected between the non-inverting input and the output, is a summing amplifier performing a subtraction between the signals presented at the non-inverting input.

In operation, offset selector circuitry 34 first compares the analog quantity $Q_o$ to each of the offset voltages in a serial manner. If the desired quantity $Q_o$ is larger than the offset voltage 46, the amplifier A1 will give a positive $SEL_1$ signal and also turn on transistor T1. Further, if the desired quantity $Q_o$ is larger than offset voltage 46 plus offset voltage 48, then the select offset injector two ($SEL_2$) line will go high in accordance with the comparison by amplifier A2. This will continue until the desired quantity $Q_o$ exceeds the sumation of the previous offset voltages. For n offset injectors there can be as many as n amplifiers and comparison circuits as shown in the diagram.

To determine the quantity of fuel that will be injected by the offset injectors, the selected lines are used to energize the transistors T1 through $T_n$ to form the analog addition of all offset voltages selected by the comparator string. This quantity, Q(offset), then is inverted in the amplifier A4 and fed to the summing junction of the amplifier A5, while the desired quantity $Q_o$ is provided through the resistor R6. The difference between the desired quantity and the quantity provided by the offset injectors then becomes the output of junction, or Q(trim).

Amplifier A5, which cooperates with a diode D10, comprises the trim selection circuitry 40 and provides a nominal gain of 1, but only when Q(trim) is positive. The diode D10 will clamp all negative swings of the amplifier to ground.

The offset driver gating circuit 36 will now be more fully explained by reference again to FIG. 4, where the trigger signal $T_i$ is connected to monostable vibrators 52, 54 and 56 to produce pulses of a fixed duration when the trigger signals $T_i$ has a transition. These fixed pulse widths are gated to the offset drivers via AND gates 60, 62 and 64. Each of the AND gates has an enabling input connected to an individual selection line of the offset select circuitry.

In operation, as the select lines produce high selection signals $SEL_1$, $SEL_2$... $SEL_n$ to indicate the selection of the particular offset injector, the fixed pulse width is transmitted through the specific AND gate selected at the time of the trigger pulse $T_i$, which causes each monostable to transition to its unstable state for the set pulse time and then return to its stable state. It should be understood that if it is preferred to drive every offset injector with the same pulse width, then only one monostable multi-vibrator need be used for the group of offset injectors. Transistor T4, T5, T6 are provided to drive injector load coils L1, L2 and L3 from the output of the AND gates.

The trim gating circuitry 42 in detail consists of a monostable multi-vibrator 58 having its trigger input connected to the line of trigger pulses $T_i$ from the fuel scheduler. The output of the amplifier A5, which is a variable voltage depending upon the amount of trim quantity desired, is input to the time constant circuitry of the monostable 58 to change the duration of its unstable state. Only if the output of the amplifier A5 is positive does the trim gating circuitry 42 have the time constant of the monostable changed in response to the differing voltage output of amplifier A5, which is an analog representation of the amount of time the trim injector must remain open. At the time of the trigger pulse $T_i$ from the fuel scheduler, the monostable 58 is transferred to its unstable state and remains there until the time constant of the circuit restores the multi-vibrator to stability. Thus a variable width pulse is generated through AND gate 66 whenever the output of the amplifier A5 is positive and the duration of which is the difference between the desired quantity and the offset quantity, or Q(trim). The output of AND gate 66 goes directly to the base of transistor T7, which forms the driver for the trim injector 16 by having its emitter connected to one input to the injector load coil and having its collector connected to the power source V. A diode D9 as poled, prevents damage to the driver amplifier from transient voltages of the inductance L4 which forms the loading coil of the fuel injector 16.

Although the preferred analog embodiment for the system has been illustrated in FIG. 4, a digital implementation of system could also be formed. $Q_o$ could be output from the fuel scheduler 32 as a digital number and compared to digital numbers representing offset quantities $Q_1$, $Q_2$, $Q_3$... $Q_n$ to select the particular offset injectors needed. The offset quantity selected could then be subtracted from the digital quantity desired $Q_o$ to produce a digital number representative of the quantity Q(trim).

Figure 2:
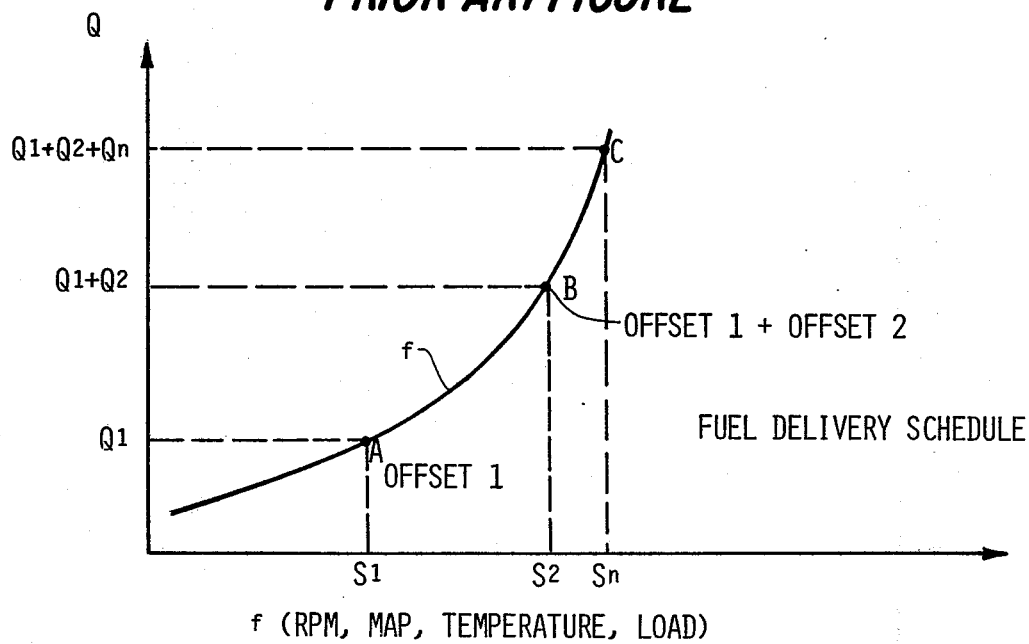
FIG. 2 is a graphical illustration of a fuel schedule for an internal combustion engine as a function of various engine operating parameters.

FIG. 5 will now be described to show the timing relationships between the fuel injection pulses transmitted to the fuel injectors in FIG. 3. FIG. 5a schematically positions the triggering pulses $T_i$ from the fuel scheduler 32 with respect to time. The pulses $T_i$ are separate commands from the fuel scheduler 32 to begin an injection cycle. FIGS. 5b, c, d, e are the output driver pulses from AND gates 60, 62, 64, and 66, respectively. The pulse widths for the offset injectors are fixed length W and occur at $T_i$ in FIGS. 5b, c and d. If these waveforms are compared while referencing FIG. 2, at $T_2$ the system will be operating at a fuel demand just higher than point A where the difference between the set pulse width of FIG. 5b for offset injector 1 (point A) is supplied by the trim injector width (WT) in FIG. 5e. In a similar manner, at $T_2$ the system is operating just above point B and at $T_3$ above point C. At $T_4$ the system demand has decreased to between points B and C, while at $T_5$, with only the trim injector operating, demand is below point A. Thus, an advantageous system has been described to precisely reproduce a complex fuel schedule with only one variable injector.

Figure 6:
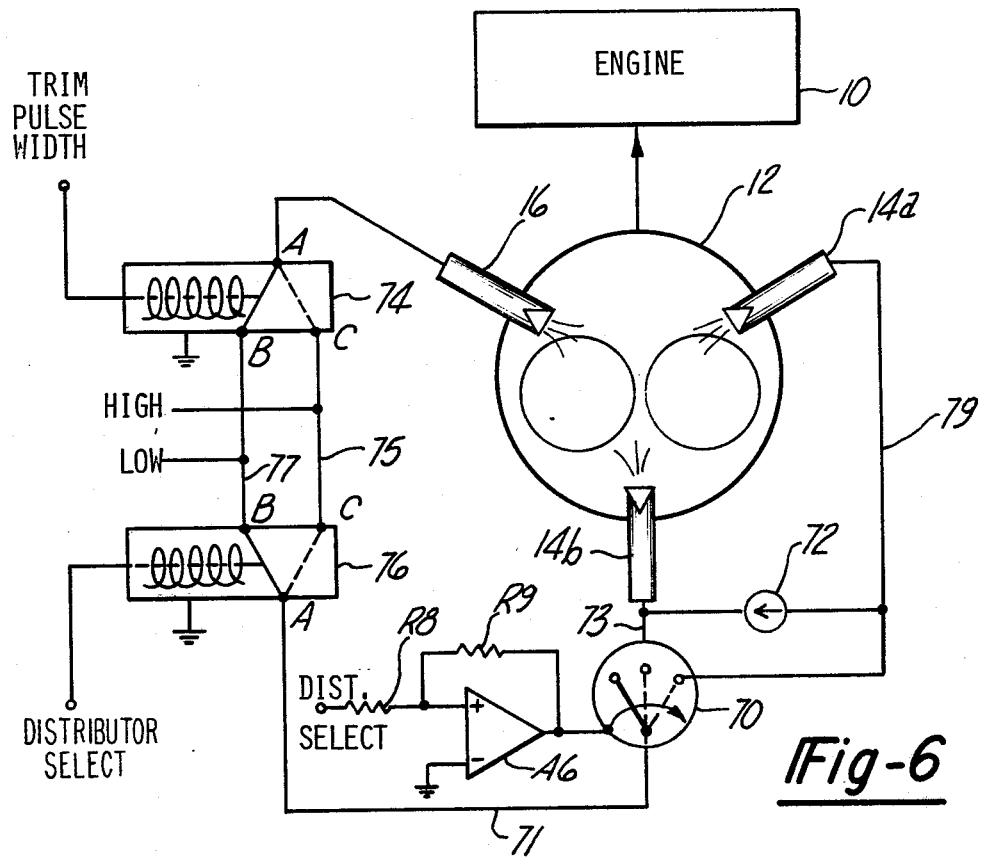
FIG. 6 is a schematic system diagram of an alternative embodiment to the system illustrated in FIG. 3.
Figure 7:
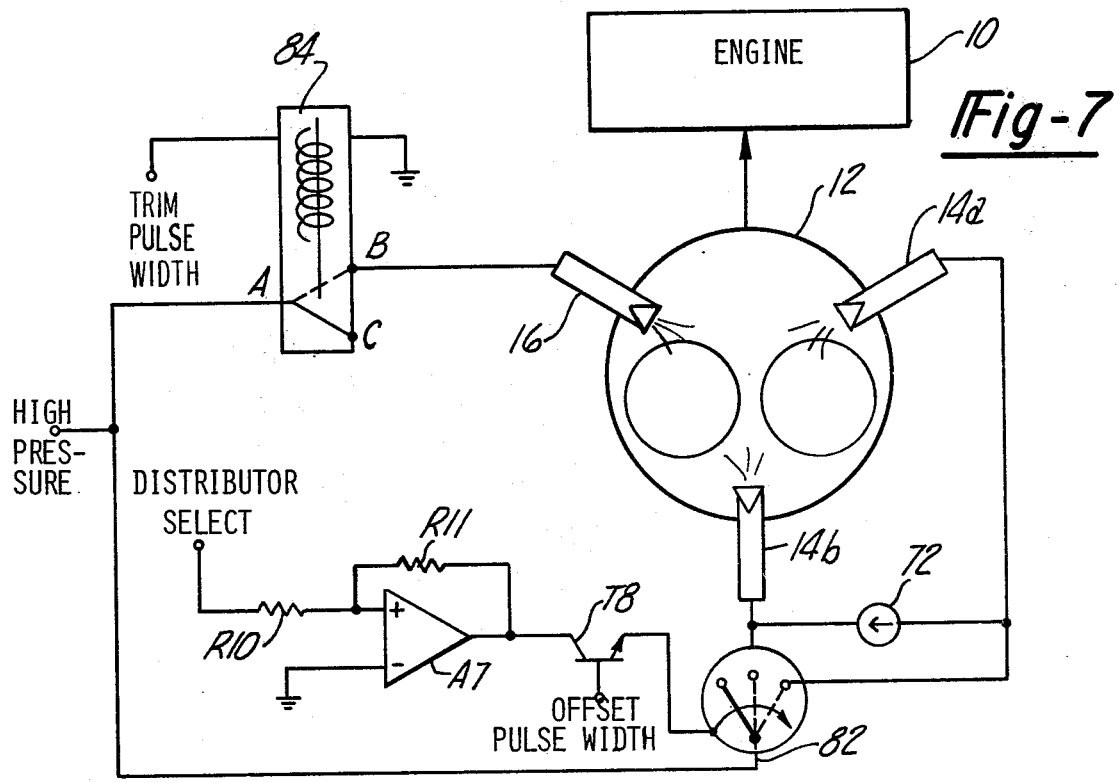
FIG. 7 is a schematic system diagram of still another alternative embodiment of the system illustrated in FIG. 3.

Alternative embodiments of the fuel injection system illustrated in FIG. 3 are further described in FIGS. 6 and 7. The system shown in FIG. 6 illustrates the use of the invention in a configuration in which solenoid injector valves are not needed. Offset injectors 14a, 14b and trim injector 16 inject fuel by being connected to a supply of high or low pressure. The closure needles in these injector valves are spring loaded or biased to close when a low pressure is applied to their inlet side and will open when a fuel line under high pressure is applied to them. Such systems may be used advantageously in situations where linearized solenoid valves are unavailable or are very expensive because of their size or number.

The injector valve 14b obtains its high pressure fuel supply via a supply line 73 connected at output port position 2 of an electromechanical distributor 70. A fuel supply line 79 for offset injector 14a is likewise connected to the distributor 70 at output port position 3. Connecting supply line 79 and 73 further is a check valve 72 which allows pressurized fuel to move freely from supply line 79 to supply line 73 but not vice versa. The input port to the distributor 70 is connected to a supply line 71 connected to an output port A of a solenoid valve 46. Input ports B and C of solenoid valve 76 communicate with a high pressure fuel supply line 75 and a low pressure fuel supply line 77.

The distributor 70 is operable to switch the supply line 71 between the three positions 1, 2 or 3 in response to increasing step voltages from the amplifier A6. Amplifier A6 is an inverting amplifier providing the correct driving polarity and receiving a distributor select signal from the offset selection circuit in FIG. 4. The distributor select signal, the output of amplifier A4, is a stair-step voltage the level of which depends on the number of offset injectors that have been selected. In operation the system produces fuel injection quantities by opening the offset injectors 14a and 14b by positioning the distributor in either positions 2 or 3 in response to the changing levels of the distributor select signal while the duration of the pulse is governed by the solenoid valve 76 being operated by a pulse of set width (output of monostable multi-vibrator 52 of FIG. 4). Likewise, trim injector 16 is supplied via supply line 77 by a variable pulse width pressure wave through the solenoid valve 74 which is operably driven by the trim pulse width signal (output of AND gate 66 of FIG. 4). This system substitutes the action of the electromechanical distributor for the extra offset gating and driver circuitry and the individaully operated solenoid injectors.

FIG. 7 describes still another embodiment of the fuel management system of FIG. 3 according to the invention where a single high pressure supply line 82 is used to supply the offset injectors 14a and 14b without a solenoid valve. The system, similarly to that of FIG. 6, is supplied with a distributor select signal from amplifier A7 in a manner as was the amplifier A6 of FIG. 6. However, a switching means, in the example transistor T8, is enabled with the offset pulse width and provides the distributor with a signal for switching between positions 1, 2 and 3 only when the gating is to take place. The trim injector 16 is supplied from the high pressure line 82 by a normally open solenoid valve 84 operated by the trim pulse width signal. This system of FIG. 7 allows a continuously atomizing fuel injector to be used to advantage.

While preferred embodiments of the system have been shown and illustrated, it will be obvious to one skilled in the art that other modifications and changes may be made thereto and the appended claims are to be construed to cover all such modifications or changes.

What is claimed is:

1. A method of fuel injecting an internal combustion engine to provide a precise quantity of fuel for a fuel management system having a plurality of fuel injectors at an ingestion point including at least one offset injector operated to provide a single quantity of fuel upon energization and only one trim injector operated to provide a variable amount of fuel upon energization, said method comprising:
   a. determining a desired quantity of fuel to be injected at the ingestion point during a particular injection time from the operating parameters of the internal combustion engine;
   b. selecting an offset level from a plurality of successive offset levels, each level being representative of a different quantity of fuel, where said level is selected when the desired quantity is greater than or equal to the selected level and less than the next successive level;
   c. injecting said selected offset level into the engine with at least one of said offset injectors;
   d. determining the difference between the selected offset level and the desired quantity to yield a trim quantity necessary to complete the injection; and
   e. injecting the trim quantity with said variable trim injector.

2. A method of fuel injecting an internal combustion engine as defined in claim 1 wherein said internal combustion engine has more than one ingestion point and said method further includes the step of:
   repeating steps a-e for each ingestion point.

3. A method of fuel injection as defined in claim 1 wherein said fuel management system includes more than one offset injector and said step of injecting said offset level includes the step of:
   calibrating each offset injector to inject a different quantity from the other offset injectors where said different quantities are equal to the offset levels.

4. A method of fuel injection as defined in claim 1 wherein said fuel management system includes more than one offset injector and said step of injecting said offset level includes the step of:
   calibrating each offset injector to inject a single quantity where each offset level is assigned to a separate offset injector and the quantity of that level is equal to the calibrated quantity of the assigned injector in addition to the quantities of the injectors assigned to previous levels.

5. A method of fuel injecting an internal combustion engine as defined in claim 4 wherein said step of selecting includes the step of:
   comparing said desired quantity to each offset level in succession and providing a selection signal for each comparison in which the desired quantity is greater than the offset level; and
   wherein said step of injecting the offset level includes the step of:
   enabling the offset injectors for energization that are assigned to each level having a selection signal.

6. A method of fuel injecting an internal combustion engine as defined in claim 5 wherein said step of injecting the offset level includes the step of:
   energizing all of the enabled offset injectors for a fixed time to thereby inject said single calibrated quantities for each offset injector during said injection time.

7. A method of fuel injecting an internal combustion engine as defined in claim 6 wherein the step of energization includes the step of:

providing a different fixed energization time for individual offset injectors.

8. A method of fuel injecting an internal combustion engine as defined in claim 6 wherein the step of determining said trim quantity includes the steps of:
summing all offset level quantities that are selected during an injection cycle to form the offset quantity; and
subtracting said offset quantity sum from said desired quantity to provide the trim quantity.

9. A method of fuel injecting an internal combustion engine as defined in claim 8 wherein the step of injecting said trim quantity includes the step of:
enabling the trim injector for energizing if said trim quantity is positive.

10. A method of fuel injecting an internal combustion engine as defined in claim 9 wherein the step of injecting said trim quantity includes the step of:
energizing the trim injector for a period of time proportional to said trim quantity during said injection time.

11. A method of fuel injecting an internal combustion engine as defined in claim 6 wherein said step of enabling includes the steps of:
generating a distributor select signal by summing each selected offset level thereby forming a stair-step signal where each higher step is the selection of a successive offset level;
rotating a distributor rotor operable to connect an input port connected to a supply of fuel pressure to sequential output ports of said distributor, wherein the output ports communicate the supply of fuel pressure to said offset injectors, said rotating occurring from port to port in response to the level changes of the distributor select signal.

12. A method of fuel injecting an internal combustion engine as defined in claim 11 wherein the step of energization includes the step of:
gating said distributor select signal to the distributor during the fixed energization time, said enabling step time being insubstantial with respect to said energization pulse width.

13. A fuel injection system for an internal combustion engine having a plurality of fuel injectors which inject fuel into at least one ingestion point of the engine, said system comprising:
a fuel scheduler means for calculating a desired quantity of fuel for injection at said ingestion point from the current operating parameters of the engine, said fuel scheduler means generating a signal representative of said desired quantity and a timing signal indicating the beginning of injection cycles during which the desired quantity is to be injected;
a plurality of offset fuel injectors, each of which is operable to deliver a single quantity of fuel at the ingestion point during each injection cycle;
a single trim fuel injector operable to deliver a variable quantity of fuel at the ingestion point during each injection cycle; and
injector control means for controlling said offset injectors and said trim injector to inject the desired quantity during the injection cycle in response to said timing signal and said desired quantity signal from the fuel scheduler means, said injector control means causing the offset injectors to inject an offset quantity which is a combination of one or more of the single quantities from said offset injectors and causing said trim injector to inject a variable trim quantity which is the difference between the desired quantity and the offset quantity.

14. A fuel injection system for an internal combustion engine as defined in claim 13 wherein said injector control means include:
offset selection means for determining in response to the desired quantity signal which of said offset injectors will be enabled during a certain injection cycle, said offset selection means providing an enabling select signal to each offset injector that is selected and said offset selection means further generating a signal that is representative of said trim quantity; and
offset gating means for gating fixed width energization pulses that operate the offset injectors, said offset gating means providing said energization pulses in response to the trigger signal from the fuel scheduler for the offset injectors that are enabled.

15. A fuel injection system for an internal combustion engine as defined in claim 14 wherein said injector control means include:
trim selection means for determining in response to said trim signal whether said trim injector will be enabled; and
trim gating means for gating a variable width energization pulse that will operate the trim injector, said trim gating means providing said variable width energization pulse in response to the trigger signal from the fuel scheduler if the trim injector is enabled.

16. A fuel injection system for an internal combustion engine as defined in claim 15 wherein said trim gating means varies the width of the trim energization pulse in response to the trim quantity signal.

17. A fuel injection system for an internal combustion engine as defined in claim 16 wherein the offset injectors and trim injector are solenoid operated injectors, and said energization pulses are applied to the load coils of the injectors to produce opening times of the injectors that are substantially representative of the pulse widths.

18. A fuel management system for injecting a precise desired quantity of fuel at an ingestion point of an internal combustion engine during an injection cycle of the engine, said system comprising:
first means for comparing the desired quantity to a first offset quantity and for generating a first offset selection signal if the desired quantity is greater than or equal to the first offset quantity;
second means for comparing the desired quantity to the sum of the first offset quantity and a second offset quantity and for generating a second offset selection signal if the desired quantity is greater than or equal to the sum of the first and second offset quantities;
difference means for determining the offset quantity level selected and for subtracting said selected offset quantity from said desired quantity to yield a trim quantity signal;
first monostable multi-vibrator means for providing a fixed length electrical pulse in response to a trigger signal indicating the beginning of an injection cycle;
second monostable multi-vibrator means for providing a fixed length electrical pulse in response to the trigger signal;
third monostable multi-vibrator means for providing a variable length electrical pulse in response to the trigger signal, said variable length pulse being proportional to said trim quantity signal;

first offset injector means having a solenoid valve operated by a load coil, said first injector energized by the fixed pulse width of said first monostable multi-vibrator being applied to its load coil upon enablement from said first selection signal;

second offset injector means having a solenoid valve operated by a load coil, said second injector energized by the fixed pulse width of said second monostable multi-vibrator being applied to its load coil upon enablement from said second selection signal; and third trim injector means having a solenoid valve operated by a load coil, said trim injector means energized by the variable length pulse of said third monostable multi-vibrator means being applied to its load coil upon enablement from said trim quantity signal.

* * * * *

UNITED STATES PATENT AND TRADEMARK OFFICE
CERTIFICATE OF CORRECTION

PATENT NO. : 4,140,088
DATED : February 20, 1979
INVENTOR(S) : Didier J. de Vulpillieres It is certified that error appears in the above-identified patent and that said Letters Patent are hereby corrected as shown below:

Col. 3, line 66 delete "non-lineanty" and insert therefor ---nonlinearity---;

Col. 5, line 26 delete "non precision" and insert therefor ---nonprecision---;

Col. 7, line 31 delete "sumation" and insert therefor ---summation---;

Col. 9, line 21 delete "46" and insert therefor ---76---;

Col. 9, line 46 delete "individaully" and insert therefor ---individually---.

Signed and Sealed this

Eighteenth Day of September 1979

[SEAL]

Attest:

Attesting Officer

LUTRELLE F. PARKER
Acting Commissioner of Patents and Trademarks